United States Patent Office 3,287,365
Patented Nov. 22, 1966

3,287,365
NOVEL DIHYDRO-s-TRIAZINES AND METHOD OF PREPARATION
Howard Newman, Spring Valley, N.Y., and Edward Leslie Moon, Trenton, and Jackson Pollard English, Princeton, N.J., assignors to American Cyanamid Company, Stamford, Conn., a corporation of Maine
No Drawing. Filed Dec. 24, 1963, Ser. No. 333,174
7 Claims. (Cl. 260—249.9)

The present invention relates to 6-membered heterocyclic nitrogen moieties and has for its principal object the utilization of such heterocyclic compounds as the active component of a herbicidal composition.

The novel heterocyclic nitrogen compounds prepared in accordance with the present invention may be represented by the formula:

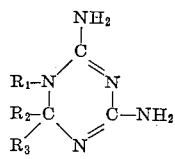

wherein $R_1$ represents aralkyl and substituted aralkyl, $R_2$ represents an alkyl, fluoroalkyl or phenyl radical, and $R_3$ represents hydrogen or an alkyl substituent.

In general, the compounds of the present invention may be prepared by a number of diverse processes. Illustrative of one such process is the reaction between (1) an aralkylbiguanide and (2) either an aldehyde or a ketone in the presence of an ethanolic mineral acid while refluxing the mixture. Each reactant is present advantageously in equimolar amounts.

Alternatively, the s-triazine of the present invention can be prepared by the reaction between dicyandiamide and an imino compound or acid addition salt thereof of the structure:

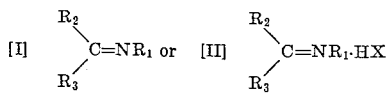

wherein $R_1$, $R_2$ and $R_3$ represent the same values as above, and X is a halogen such as fluoro, chloro, bromo or iodo. Preferably, the reaction is carried out in the presence of an inert solvent, such as dimethylformamide, for best overall results.

Exemplary of the imino derivatives are: benzylidenebenzylamine; benzylidene-4-chlorobenzylaminehydrochloride; 2,2,2-trimethylethylidene-benzylamine hydrochloride; 2,2,2-trifluoroethylidene-p-chlorobenzylamine, homologs and isomers thereof.

If desired, 1-phenyl or p-chlorophenyl-s-triazines in lieu of 1-benzyl-s-triazine derivatives may be prepared by utilizing the above method. Thus, isopropylidene aniline or isopropylidene p-chloroaniline can be employed as suitable reactants.

It is an advantage of the present invention that a large number of aralkylbiguanides or halides thereof may be employed. Illustrative of these are: benzylbiguanides, benzylbiguanide hydrochloride, o-nitrobenzylbiguanide and o-methoxybenzylbiguanide.

Examplary aldehydes and ketones for use in the biguanide process are: acetaldehyde, benzaldehyde, acetone, propionaldehyde, methylethylketone, methylisobutyl ketone, homologs and isomers thereof.

In order to facilitate a further understanding of the invention, the following illustrative examples are presented. These are not to be taken as limitative of the invention. Unless otherwise stated, the parts of solids are by weight, parts of liquids are by volume, and the analyses are in percent.

*Example 1.—Preparation of 4,6-diamino-1-benzyl-1,2-dihydro-2,2-dimethyl-s-triazine hydrochloride*

A suspension of 2 parts of benzylbiguanide hydrochloride in a mixture of 25 parts of absolute ethanol and 10 parts of acetone containing one part of concentrated hydrochloric acid is heated under reflux for twenty-four to forty-eight hours. The solvents are removed under reduced pressure, the yellow syrupy residue taken up in 10 parts of water, and the pH of the solution is adjusted to 6 to 7 with 2 N sodium hydroxide. Resultant s-triazine compound separates as a colorless solid in good yield and has a melting point equal to between 191° C. and 194° C. Recrystallization from water yields analytically pure monohydrate having a melting point equal to 194° C. to 197° C. Upon analysis, the following is obtained in percent: Calculated: C, 50.43; H, 7.05; N, 24.50; Cl, 12.41. Found: C, 50.39; H, 7.15; N, 24.58; Cl, 12.33.

*Example 2*

Repeating the procedure of Example 1 in every detail, 4,6 - diamino-1-p-chlorobenzyl-1,2-dihydro-2,2-dimethyl-s-triazine hydrochloride, having a melting point equal to between 222° C. and 224° C., and 4,6-diamino-1-(3,4-dimethoxybenzyl) - 1,2-dihydro-2,2-dimethyl-s-triazine hydrochloride, having a melting point equal to between 199° C. and 201° C. are each prepared by allowing acetone to react with p-chlorobenzylbiguanide hydrochloride and 3,4-dimethoxybenzylbiguanide hydrochloride, respectively. The nitrate salt of the latter triazine, having a melting point equal to between 222° C. and 223° C., is prepared by treating an aqueous solution of the hydrochloride with sodium nitrate and collecting the material which separates.

*Example 3.—Preparation of 4,6-diamino-1-benzyl-1,2-dihydro-2-phenyl-s-triazine hydrochloride*

3.9 parts of benzylidenebenzylamine and 1.7 parts of dicyandiamide are placed in a flame-dried flask fitted with a stirrer and gas inlet tube. An equivalent of hydrogen chloride gas (i.e., 0.73 part) is passed into the flask. The reaction mixture results in a pasty solid as the hydrogen chloride is consumed. The solid mass is heated at 130° C. for one hour which results in the formation of a yellow liquid. As the molten product cools to 25° C., it forms a brittle glass-like solid which is then broken up and crystallized from a 50:50 mixture of acetonitrile-ethanol. The melting point of the crystalline material is between 230° C. and 232° C.

*Example 4*

Employing similar molar ratios and procedures as in Example 3 above, 4,6-diamino-1-(3,4-dimethoxybenzyl)-1,2-dihydro-2-phenyl-s-triazine hydrochloride whose melting point is between 183° C. and 185° C., is prepared from dicyandiamide and benzylidene-3,4-dimethoxybenzylamine.

*Example 5.—Preparation of 4,6-diamino-1-benzyl-1,2-dihydro-2-undecyl-s-triazine hydrochloride*

5.13 parts of benzylbiguanide hydrochloride and 4.15 parts of dodecylaldehyde are intimately mixed in a glass vessel and heated at 135° C. for forty-five hours. The crude reaction mixture is boiled with 100 parts of acetone, filtered from insoluble material, and the filtrate is allowed to stand at room temperature for three days. 1.6 parts of white crystalline product are obtained having a melting point of 183° C. to 185° C. and analyzing as follows:
Calculated: C, 64.01; H, 9.21; N, 17.77; Cl, 8.99. Found: C, 64.18; H, 9.10; N, 18.02; Cl, 9.03.

*Example 6.—Preparation of 4,6-diamino-1-(p-chlorobenzyl)-1,2-dihydro-2-phenyl-s-triazine hydrochloride*

49.0 parts of benzylidene-4-chlorobenzylamine hydrochloride are formed by passing anhydrous hydrogen chloride gas into a solution of 42.2 parts of benzylidene-4-chlorobenzylamine in 1000 parts of anhydrous ether. The precipitated salt is collected by filtration and dried in vacuo.

49.0 parts of benzylidene-4-chlorobenzylamine hydrochloride and 15.5 parts of dicyandiamide are intimately mixed in a dry flask and heated at 150° C. for two hours. The solids melt slowly, forming a clear yellow liquid which solidifies on cooling. The solid is broken up and extracted with 200 parts of water for sixteen hours in a Soxhlet apparatus. The aqueous extract is then extracted continuously with 300 parts of ether for sixteen hours, boiled for fifteen minutes to expel dissolved ether and filtered. Upon refrigeration of the aqueous solution at 10° C. for four days, 37.4 parts of white crystals are obtained, having a melting point between 185° C. and 187° C.

*Example 7.—Preparation of 4,6-diamino-1-benzyl-1,2-dihydro-2-tert-butyl-s-triazine hydrochloride*

8.4 parts of 2,2,2-trimethylethylidenebenzylamine hydrochloride are formed by passing anhydrous hydrogen chloride into a solution of 7.0 parts of 2,2,2-trimethylethylidenebenzylamine in 200 parts of anhydrous ether. The precipitated salt is collected by filtration and dried in vacuo.

A solution of 8.4 parts of 2,2,2-trimethylethylidenebenzylamine hydrochloride and 3.36 parts of dicyandiamide in 100 parts of dry dimethylformamide is stirred for sixteen hours at 25° C. The solution is poured into 500 parts of acetone, and a white crystalline solid is obtained. Recrystallization from 10% ether in ethanol yields 9.15 parts of white crystals possessing a melting point between 245° C. and 247° C. and having the following analysis:
Calculated: C, 56.83; H, 7.49; N, 23.67; Cl, 11.98.
Found: C, 56.79; H, 7.62; N, 23.73; Cl, 11.97.

*Example 8.—Preparation of 4,6-diamino-1-(p-chlorobenzyl)-1,2-dihydro-2-trifluoromethyl-s-triazine hydrochloride*

6.7 parts of 2,2,2-trifluoroethylidene-p-chlorobenzylamine are dissolved in 20 parts of anhydrous diethyl ether, and anhydrous hydrogen chloride is passed into the solution until it is saturated. The ether and excess hydrogen chloride are removed with a stream of nitrogen and the pasty residue is dissolved in 25 parts of dry dimethylformamide. The addition of 2.5 parts of dicyandiamide results in a temperature increase of 50° C. The stirred reaction mixture is permitted to cool to room temperature and poured into 200 parts of ether. The solid which separates is slurried twice with fresh ether, collected by filtration and dried. Crystallization from an ethanol-isopropanol-acetone solution (5:1:1) yields 6.4 parts of fine white crystals, having a melting point between 276° C. and 278° C.

*Example 9*

Employing similar molar ratios and procedures as in Example 8 above, 4,6-diamino-1-benzyl-1,2-dihydro-2-trifluoromethyl-s-triazine hydrochloride, possessing a melting point of 290° C., is prepared from dicyandiamide and 2,2,2-trifluoroethylidenebenzylamine.

*Example 10.—Preparation of N'-(3,4-dimethoxybenzyl)-biguanide hydrochloride intermediate*

17.2 parts of 3,4-dimethoxybenzylamine hydrochloride and 7.2 parts of dicyandiamide are fused at 175° C. for thirty-five minutes, cooled slowly by adding 150 parts of ethanol to the hot mixture, and stirred until a solution is attained. The warm alcoholic solution, upon cooling, results in 19.3 parts of fine white crystals having a melting point of 191° C. to 192° C.

*Example 11.—Preparation of N-benzylidene-p-chlorobenzylamine intermediate*

14.2 parts of p-chlorobenzylamine and 10.6 parts of benzaldehyde are refluxed in 50 parts of dry benzene containing .05 part of p-toluenesulfonic acid. Water is removed with a Dean-Stark trap. The benzene solvent is next evaporated under reduced pressure and 20 parts of anhydrous ether are then added. Refrigeration of the ether solution for two hours at 10° C. yields 9.2 parts of crystals having a melting point of 36° C. to 37° C.

*Example 12*

N-benzylidene-3,4-dimethoxybenzylamine having a boiling point equal to 150° C. at .007 mm. Hg, is prepared by reacting equimolar amounts veratrylamine with benzaldehyde, and 2,2,2-trimethylethylidenebenzylamine having a melting point equal to between 122° C. and 125° C. is prepared by reacting equimolar amounts of benzylamine and pivalaldehyde.

*Example 13.—Preparation of N-2,2,2-trifluoroethylidenebenzyamine intermediate*

10.0 parts of trifluoroacetaldehyde ethyl hemiacetal and 7.5 parts of benzylamine are heated under reflux as in Example 11. After the removal of water and alcohol, the trap is cleaned and dried, and a small piece of sodium metal is placed in the trap. Heating under reflux is continued for ten hours. Benzene is evaporated and the residue distilled yielding 9.7 parts of colorless liquid whose boiling point is 58° C. to 58.5° C. at 3 mm. Hg.

*Example 14*

Repeating the procedure of Example 13, N-2,2,2,-trifluoroethylidene-p-chlorobenzylamine, whose boiling point is 75° C. to 76° C. at .7 mm. Hg, is obtained from the reaction between trifluoroacetaldehyde ethyl hemiacetal and p-chlorobenzylamine.

*Example 15.—Preparation of 4,6-diamino-1,2-dihydro-2,2-dimethyl 1-phenyl-s-triazine hydrochloride*

To 1.33 parts of isopropylideneaniline in a suitable reaction vessel provided with an inert dry atmosphere are added 10 parts of a molar solution of anhydrous hydrogen chloride gas in N,N-dimethylformamide and 0.84 part of dicyandiamide. The resultant solution is stirred for one day. The solution is diluted with 25 parts of ether and the resulting suspension is next collected by filtration. Solid is washed with two fresh 50 part portions of ether. Recrystallization from aqueous ethanol yields 0.7 part of crystalline product having a melting point equal to between 206° C. and 208° C.

*Example 16.—Preparation of 4,6-diamino-1,2-dihydro-2,2-dimethyl 1-(-chlorophenyl)-s-triazine hydrochloride*

The reaction of 1.67 parts of isopropylidene-p-chloroaniline with 0.84 part of dicyandiamide as in Example 15 above yields 4,6-diamino-1,2-dihydro-2,2-dimethyl-1-(p-chlorophenyl)-s-triazine hydrochloride in good yield. This product is identical with material prepared by the reaction of p-chlorophenylbiguanide with acetone.

Advantageously, the compounds of the present invention are useful pre-emergence herbicides. This is demonstrated by the following examples wherein several compounds are tested for pre-emergence herbicidal activity against a number of species of plant seeds. The compounds to be tested are dissolved or dispersed in water and thoroughly mixed with potato dextrose agar. The agar containing 500 parts per million of compound is then poured into small jars to a depth of about one inch and permitted to solidify. When solidified, two corn kernels and there radish, wheat and cucumber seeds are placed on top of the agar in individual jars. These tests are replicated to assure accurate determination of activity with each compound. All jars containing agar, seeds and test compound are then placed on tables for three weeks.

At the end of the holding period, all seeds are examined and rated according to the phytotoxicity key below: 0=normal; 9=seed dead; 8=plant dead; 7=root dead; 6=blind germination; 5=germinate, grow then die; 4 = leaf malformation; 3 = chlorosis; 2 = suppressed growth; 1=elongated stems.

The results obtained in these tests are presented in the following table.

TABLE I

| Compound | Test Plant | | | |
|---|---|---|---|---|
| | Wheat | Radish | Cucumber | Corn |
| 4,6-diamino-1-benzyl-1,2-dihydro-2,2-dimethyl-s-triazine hydrochloride | 0 | 6 | 0 | 0 |
| 4,6-diamino-1-p-chlorobenzyl-1,2-dihydro-2,2-dimethyl-s-triazine hydrochloride | 6 | 5 | 6 | 8 |
| 4,6-diamino-1-benzyl-1,2-dihydro-2-phenyl-s-triazine hydrochloride | 7 | 6 | 5 | 7 |
| 4,6-diamino-1-(p-chlorobenzyl)-1,2-dihydro-2-phenyl-s-triazine hydrochloride | 0 | 0 | 6 | 6 |
| 4,6-diamino-1-benzyl-1,2-dihydro-2-tert.-butyl-s-triazine hydrochloride | 0 | 0 | 9 | 0 |
| 4,6-diamino-1-(p-chlorobenzyl)-1,2-dihydro-2-trifluoromethyl-s-triazine hydrochloride | 0 | 6 | 6 | 7 |

From the above data, it is clear that representative compounds of the present invention are valuable herbicidal reagents.

We claim:
1. The compound: 4,6-diamino-1-benzyl-1,2-dihydro-2-phenyl-s-triazine hydrochloride.
2. The compound: 4,6-diamino-1-(p-chlorobenzyl)-1,2-dihydro-2-phenyl-s-triazine hydrochloride.
3. The compound: 4,6-diamino-1-benzyl-1,2-dihydro-2-tert.-butyl-s-triazine hydrochloride.
4. The compound: 4,6-diamino-1-(p-chlorobenzyl)- 1,2-dihydro-2-trifluoromethyl-s-triazine hydrochloride.

5. A process for the preparation of a dihydro symmetrical triazine compound of the formula:

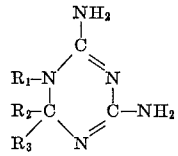

wherein $R_1$ is selected from the group consisting of phenyl, halo-ring-substituted phenyl, benzyl, lower alkoxy-ring-substituted benzyl and chloro-ring-substituted benzyl; $R_2$ is a radical selected from the group consisting of lower alkyl and phenyl; and $R_3$ is hydrogen and lower alkyl, comprising: treating an imino compound of the formula:

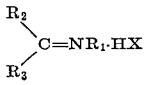

wherein $R_1$, $R_2$ and $R_3$ are as described above and X is selected from the group consisting of chlorine and bromine, with dicyandiamide in the presence of an inert solvent, and recovering desired triazine of the above-identified formula in good yield and purity.

6. A process according to claim 5, wherein the imino compound is benzylidene-benzylamine hydrochloride.

7. A process according to claim 5, wherein the imino compound is benzylidene-4-chlorobenzylamine hydrochloride.

References Cited by the Examiner

UNITED STATES PATENTS 3,155,486  11/1964  Stevenson et al. __ 260—249.9 X

OTHER REFERENCES

Smolin et al., "s-Triazines and Derivatives," Interscience Publishers Inc., New York (1959), p. 230.

JOHN D. RANDOLPH, *Primary Examiner.*

WALTER A. MODANCE, *Examiner.*

J. M. FORD, *Assistant Examiner.*